United States Patent
Popoola et al.

[19]

[11] Patent Number: 6,017,591
[45] Date of Patent: Jan. 25, 2000

[54] METHOD OF MAKING ADHERENTLY SPRAYED VALVE SEATS

[75] Inventors: Oludele Olusegun Popoola, Grand Blanc; Robert Corbly McCune, Southfield; Larry Van Reatherford, Clarkston; Eddie Lee Cartwright, Southfield, all of Mich.

[73] Assignee: Ford Global Technologies, Inc., Dearborn, Mich.

[21] Appl. No.: 08/749,317

[22] Filed: Nov. 14, 1996

[51] Int. Cl.$^7$ .................................. C23C 4/02; C23C 4/16
[52] U.S. Cl. ...................... 427/449; 427/453; 427/455; 427/456; 219/69.17
[58] Field of Search .............................. 219/69.17, 69.16, 219/69.13, 69.18; 427/449, 453, 456, 455

[56] References Cited

U.S. PATENT DOCUMENTS

| | | | |
|---|---|---|---|
| 1,961,917 | 6/1934 | Smith, Jr. ............................ | 29/156.7 |
| 2,496,248 | 1/1950 | Jennings ............................. | 75/128 |
| 2,513,939 | 7/1950 | Hoern .................................. | 29/156.7 |
| 2,908,073 | 10/1959 | Dulin ................................... | 29/488 |
| 3,025,182 | 3/1962 | Schreewelius . | |
| 3,100,724 | 8/1963 | Rocheville ........................... | 118/308 |
| 3,490,116 | 1/1970 | Cape .................................... | 29/18 |
| 3,640,755 | 2/1972 | Barth . | |
| 3,844,729 | 10/1974 | Sedlatschek et al. ............... | 29/195 |
| 4,059,876 | 11/1977 | Ditto . | |
| 4,378,332 | 3/1983 | Chang et al. ....................... | 420/486 |
| 4,505,988 | 3/1985 | Urano et al. ........................ | 428/569 |
| 4,554,898 | 11/1985 | Yamada et al. . | |
| 4,570,585 | 2/1986 | Hayashi .............................. | 123/188 S |
| 4,578,114 | 3/1986 | Rangaswamy et al. ............. | 75/252 |
| 4,578,115 | 3/1986 | Harrington et al. ................. | 75/255 |
| 4,721,839 | 1/1988 | Dzewaltowski et al. . | |
| 4,723,518 | 2/1988 | Kawasaki et al. ................... | 123/188 S |
| 4,935,266 | 6/1990 | Steine et al. ........................ | 420/12 |
| 5,271,967 | 12/1993 | Kramer et al. ...................... | 427/455 |
| 5,364,663 | 11/1994 | McCune, Jr. et al. .............. | 427/449 |
| 5,466,906 | 11/1995 | McCune et al. .................... | 427/449 |
| 5,480,497 | 1/1996 | Zaluzec et al. . | |
| 5,592,927 | 1/1997 | Zaluzec et al. ..................... | 123/838 |
| 5,648,122 | 7/1997 | Rao et al. ........................... | 427/444 |

FOREIGN PATENT DOCUMENTS

| | | |
|---|---|---|
| 0 170 388 | 2/1986 | European Pat. Off. . |
| 44 29 299 A1 | 2/1996 | Germany . |
| 96 18747 | 6/1996 | WIPO . |

*Primary Examiner*—Katherine A. Bareford
*Attorney, Agent, or Firm*—Joseph W. Malleck

[57] ABSTRACT

A method of defining valve seats on valve seat supports of an internal combustion engine head. The method includes steps of; (a) roughening the exposed surface of the valve seat support to a finish of 10–50 μm RA; (b) thermally spraying a stream of composite particles onto the roughened support surface, using gaseous propellants with sufficient heat and force to produce a dense adherent composite coating of metal and metal oxide particles and to a thickness no greater than 1–1.5 mm; and (c) finish machining if necessary, the sprayed coating to define the valve seat surface. The composite coated product consists of a metal/metal oxide mixture that possesses one or more of the following characteristics: a surface porosity of 2–5%, a density of 6.5–8 grams/cc, a Vickers hardness of about 280 kg/mm$^2$ at 450° C., high wear resistance and high corrosion resistance.

11 Claims, 4 Drawing Sheets

METHOD OF MAKING ADHERENTLY SPRAYED VALVE SEATS

BACKGROUND OF THE INVENTION

1. Technical Field

This invention relates to the technology of enhancing valve seat performance in automotive engine components and more particularly to techniques for adding materials that define enhanced valve seats in aluminum components, such as in an aluminum cylinder head.

2. Discussion of the Prior Art

Valve seat inserts for aluminum alloy engine heads have been used for some time to reinforce the valve seat areas that are continuously impacted by valves under high temperature and shock. These inserts are usually made of iron, or nickel-based powder-metal compacts to withstand the heat, stress and impact loading that is experienced in such applications. The inserts are welded, pressed into, or shrunk-fit into pre-machined pockets of the head seat support. Although such inserts enhance wear resistance beyond that of the parent aluminum, they may limit engine combustion parameters by restricting heat flow from the valves into the cylinder head and ultimately to the cooling jacket. The increase in temperature can result from two aspects. First, there can be gaps as large as 50–150 micrometers between the insert and parent support metal of the cylinder head; such gaps prevent efficient heat evacuation away from the seat through the head during combustion, consequently increasing the temperature of the valves in contact with such seats. Secondly, inserts need to have a significant thickness to assure adequate rigidity during mechanical installation; such thickness contributes to thermal resistance, thus limiting heat flow from the valves. As a consequence engine operation may have to be modified to prevent extreme temperatures from being experienced by the valves, such as by restricting the degree of spark advance thereby limiting the available horsepower and torque.

Attempts by the prior art to reduce thermal barriers created by powder metal inserts have included cast-in-place inserts, hot pressed/forged inserts, and laser cladding. Cast-in-place inserts and hot press/forged inserts lead to unacceptable tolerance and diffusion of aluminum into the inserts which reduces their strength, wear and corrosion resistance; laser cladding is usually of preplaced or simultaneously fed powders or wires of hard facing alloys into the valve seat region. Laser cladding can reduce the valve operating temperature by as much as 150° F. (see U.S. Pat. Nos. 4,378,332 and 4,723,518). Unfortunately laser cladding has some major disadvantages: (a) it is very expensive and difficult to adapt to high volume manufacturing; (b) its use requires castings of extraordinary quality since any residual gas in the head casting may be liberated during cladding and cause porosity or expulsion of the clad; (c) laser cladding introduces a significant amount of heat into the seat supporting region which significantly modifies metallurgy of the underlying aluminum alloy; and (d) special treatment may be needed for the surface prior to cladding to provide for laser coupling to the aluminum and allow the process to be carried out.

SUMMARY OF THE INVENTION

It is an object of this invention to provide a technique for creating ultrathin valve seats that not only eliminate gaps between the seat and parent metal, but are simple and economical to fabricate, do not alter the metallurgy of the underlying aluminum, and are versatile and adaptable to work with various cast aluminum alloys.

The invention herein fully meets the above object and, in a first aspect, is a method of defining valve seats on valve seat supports of an internal combustion engine head. The method comprises (a) roughening the exposed surface of the valve seat support to a finish of 10–50 $\mu$m Ra (such step can uniquely comprise concurrent or simultaneous formation of annular pockets in the valve seat support and roughening of such pocket surface by electric discharge machining); (b) thermally spraying a stream of particles onto the roughened support surface using gaseous propellants with sufficient heat and force to produce a dense adherent coating (the coating advantageously can comprise a composite of metal and metal oxide particles) in a thickness no greater than 1–1.5 mm; and (c) finish machining if necessary, the sprayed coating to define the valve seating surface.

The invention, in a second aspect, is a composite coated product consisting of a metal/metal oxide mixture that possesses one or more of the following characteristics: a surface porosity of 2–5%, a density of 6.5–8 grams/cc, a Vickers hardness of about 280 kg/mm$^2$ at 450° C., high wear resistance, and high corrosion resistance.

DETAILED DESCRIPTION AND BEST MODE

Figure 1:
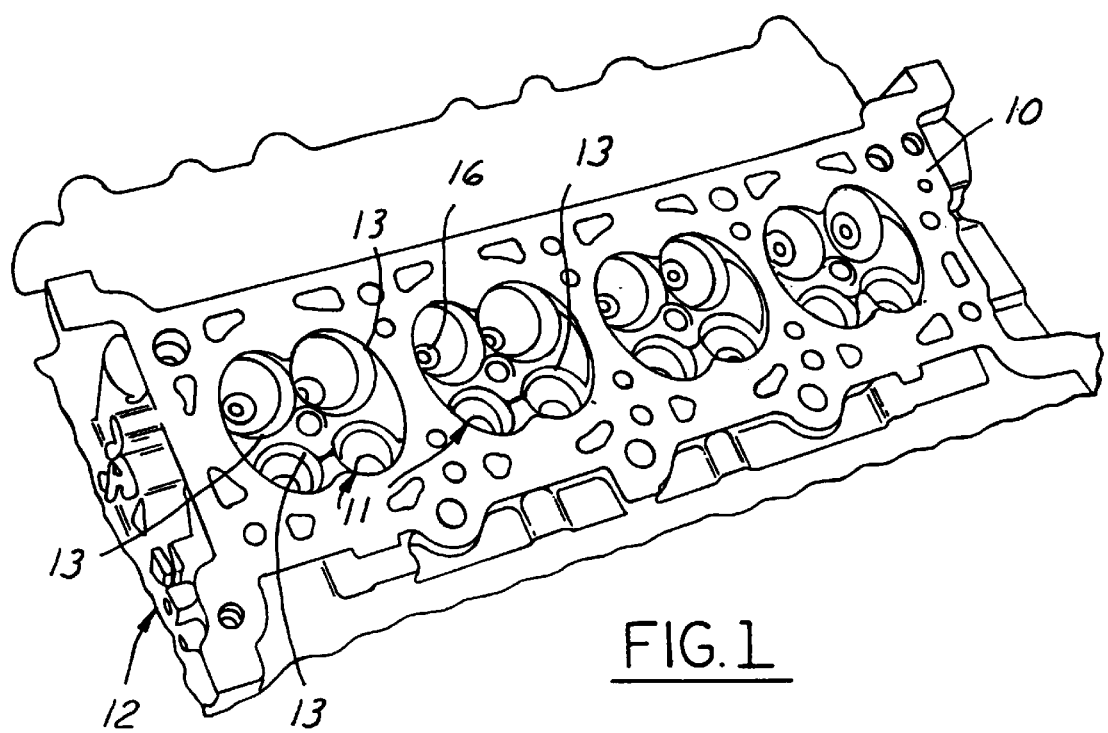
FIG. 1 is a perspective view of the combustion side of an internal combustion engine head which has been initially prepared in accordance with the invention herein.
Figure 2:
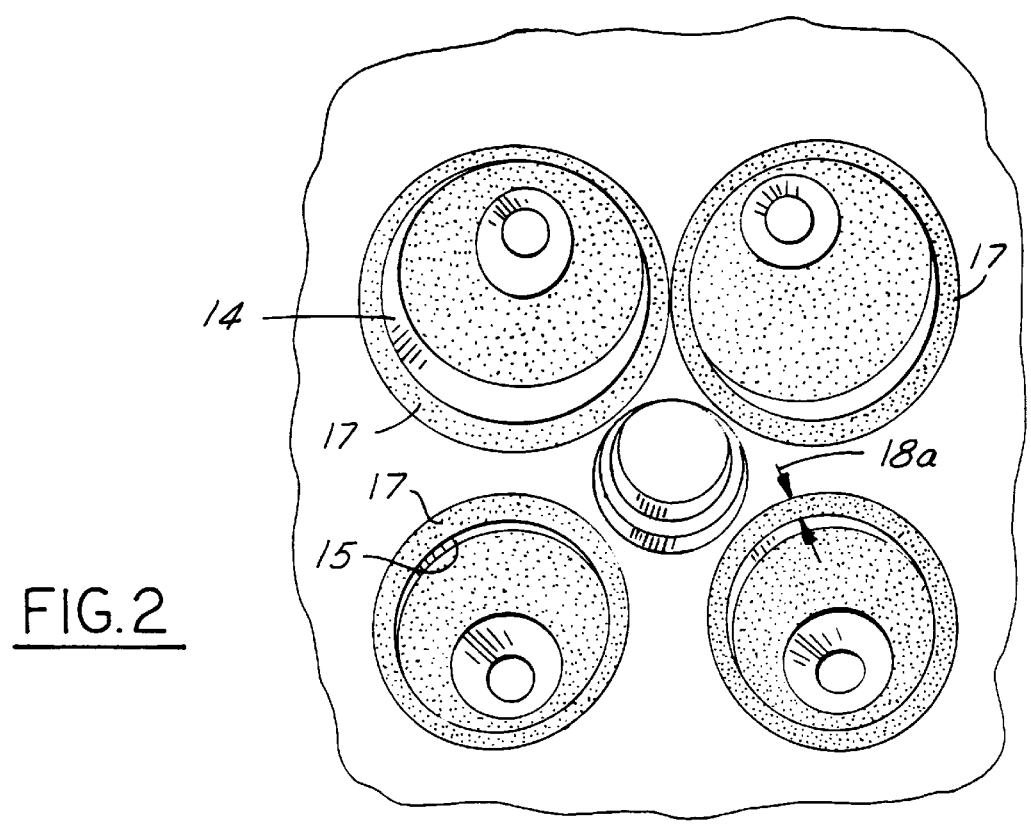
FIG. 2 is a greatly enlarged frontal view of one of the combustion chamber showing the cluster of valve seat areas roughened in accordance with the first step of the method herein.
Figure 3:
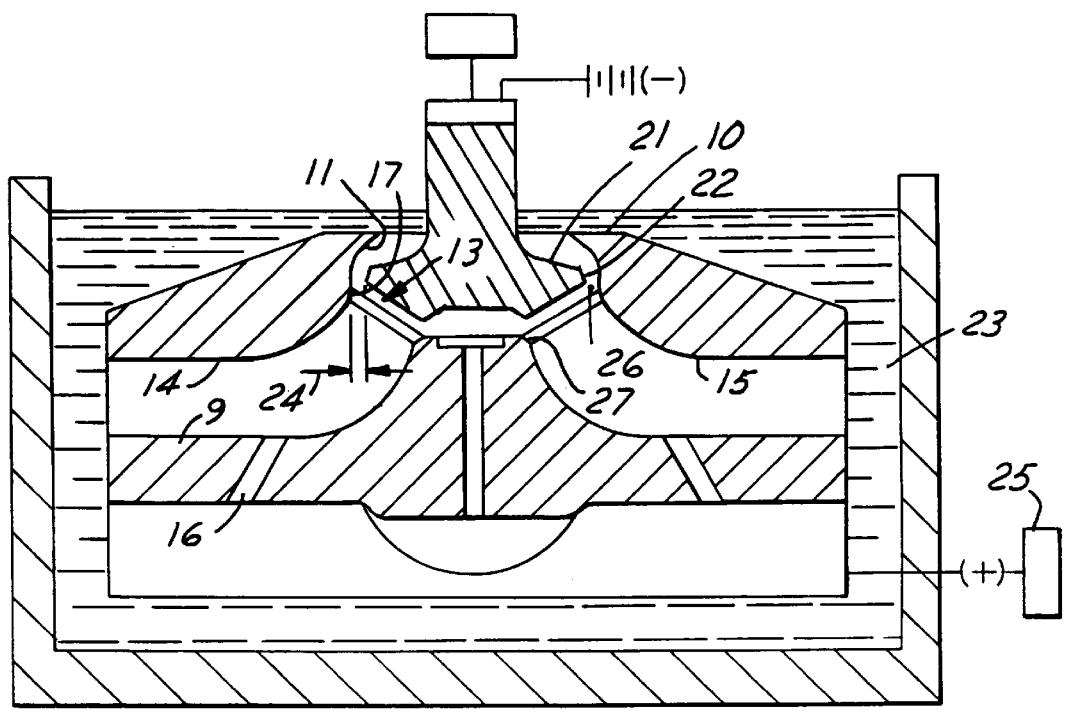
FIG. 3 is an enlarged cross sectional view of a part of the head, taken along line 2—2 of FIG. 1, and depicting how roughening is carried out by electrical discharge machining (EDM)

FIG. 1 shows the combustion face 10 of one bank of combustion chambers 11 for a typical 4.6 liter V-8 aluminum head 12. Each chamber 11 envelopes four annular valve openings 13 which communicate with pairs of intake and exhaust passages 14, 15; valve stem guide openings 16 extend through the passage walls 9 and one appears below each valve seat opening. Each valve opening 13 presents an annular valve seat supporting area or margin 17 which has been pocket machined and roughened to a desired shape. As shown in FIG. 2, margin 17 is shaped to present an annular support surface or pocket 28 that has a width 18a of about 0.20 inches, a depth 18b of about 0.05–0.08 inches. The pocket is shaped about axis 19 and is angled at 20 with respect to such axis.

Such shaping and roughening of the annular pockets 28 advantageously is carried out by electric discharge machining (EDM) wherein the head 12 and a machined electrode 21 (carrying a shaping surface 22) are placed in an electrolyte bath 23 or at least that portion of the head that is adjacent the valve seat supporting margin 17; the electrode 21 is placed within a distance 24 of about 0.002 inches of the margin 17. The head is connected as an anode by suitable means 25. A voltage of about 80–100 volts is applied to electrode 21 as a cathode with a current of about 50–100 amps and by use of alternating pulses to create a spark discharge 26 that has an "on" a period of about 150–300 microseconds with pauses there between of about 100–200 microseconds. Such electrical discharge will melt and remove some micro particles of the metal at the margin while resolidifying other micro-particles in accordance with the spark intensity, resulting in a prepared surface 27 that desirably has a finish of about Ra 10–20 micrometers. The electrode 21 is preferably moved progressively to and along the margin 17 to remove aluminum metal thereof to a depth of about 0.05–0.08 inches during a period of about 5 minutes. The power of the EDM apparatus is controlled to concurrently remove metal to shape the pocket and also create a desired degree of roughness (10 μm Ra) which demands rapid resolidification of some of the globules without being carried away to establish such roughness. Such minimum power level is 4000 watts to effect simultaneous shaping and roughening.

The electrolyte must have plasma forming capabilities and is circulated through a gap created by the electrode (shaped complementary to the seat support surface) and the margin 17. Electrical discharge across the gap results in a rapid melting carrying away of some and resolidification of other seat support metal. It is preferable to apply a D.C. voltage of about 60–80 volts to the cathode; this will promote a growing of a plasma channel between the anode electrode and seat support surface during the pulse "on time". The plasma temperature will reach very high levels, such as 40,000 K and the plasma pressure can rise to as much as 3K bar. There will be a melting and reshaping of certain of the metal globules, distorting their shape to effect roughness. In a micro-fraction of time, the dielectric fluid quenches the molten material. The amperage may be in the range of 50–100 amps, the pulse on period being 150–300 microseconds and the pause between pulse is about 100–200 micro-seconds. The seat support material will be affected to depth of about 200–400 μm and exhibit a rough surface with distinct asperities, as shown in FIG. 2.

Electric discharge machining provides excellent adhesion of a thermally sprayed coating on metal thereover because of the topographical and chemical characteristics of the produced surface. However, other techniques such as lathe turning, grit blasting and high pressure water jet can be used to roughen the machined pocket surfaces. Moreover, electric discharge machining produces a hardened surface layer on aluminum alloys which is an advantage.

Figure 4:
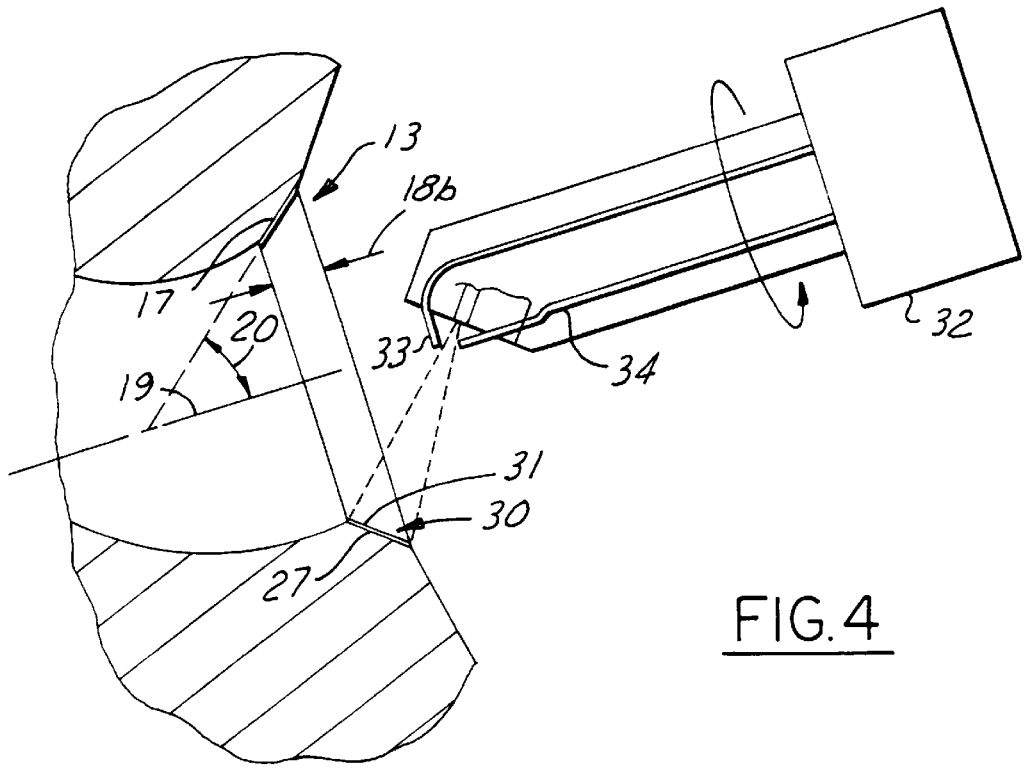
FIG. 4 is am enlarged cross-section of a portion of the head in FIG. 3, illustrating how one mode of thermal spraying is carried out to effect application of the sprayed valve seat.

As shown in FIG. 4 an integral valve seat 30, consisting of a sprayed thin metal/ceramic composite coating 31 is formed by manipulation of a thermal spraying gun 32, the coating 31 being a composite of oxides of the sprayed metal deposited along with particles of the metal itself. The composite coating adheres strongly to the prepared surface 27 and possesses excellent tribological properties. The step of spraying may be preferably carried out by high temperature thermal spraying using a two wire arc technique producing a net metal content in the coating 31 that comprises, by weight percentage 0.2–0.5 carbon, 10–12.5 chromium, 3–5 molybdenum, 0.2–1 manganese, 20–30 nickel with the balance being iron. Such metal content may be obtained by simultaneously feeding the two wires 33, 34 into a two wire arc spraying gun operating at voltages between 20–30 volts and at currents of 100–300 amps. The first wire 33 is preferably a steel wire with a composition by weight percentage of 0.5–1 carbon, 1.6–2 chromium, 1.65–1.95 manganese and the remainder iron (sometimes referred to as Tufton™). The second wire 34 is an nickel alloy with the composition 3–4 niobium, 8–10 molybdenum, 20–23 chromium, 5 iron and 58 percent nickel (sometimes referred to as Inconel 625™). The sprayed coating thickness is desirably about 1.5 mm. To obtain the oxide content in the coating, an atomizing gas, containing at least 90% by volume air is used with a pressure to produce droplet sizes of 60 micrometers or less when projected in a pressure range of 55–120 psi. Larger droplet sizes generally lead to unacceptable coatings. Air entrained in the spray reacts with the molten elements of the droplets to promote formation of an oxide phase. The resulting coating will contain metal phases of nickel, iron, $Fe_3O_4$ and CrO as major phases. The oxide content will be between 5–10% by volume depending on the atomizing gas oxidizing character. Such oxide content provides durability to the metal coating while also behaving as a high temperature solid lubricant during sliding contact.

Figure 5:
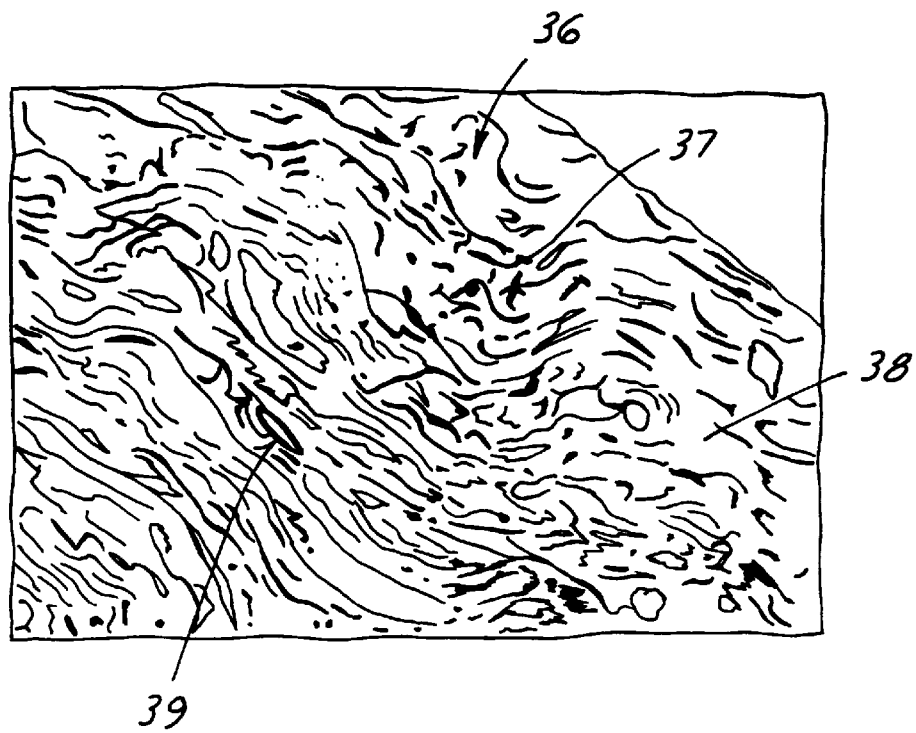
FIG. 5 is a scanning electron micrograph of the valve seat material that has been deposited in accordance with this invention (250×magnification)

FIG. 5 shows a typical microstructure of the coating consisting of a mixture of splats 36 of ceramic metal 32/oxide 37 and metal 38 particles. Please note the porosity black regions are under 1% by volume of the microstructure. The tribological properties of the coating are provided in part by the presence of oxide phases; wear is about 0.002 inches after 100 hours of dynamometer testing for an engine operating at 5,500 rpm (developing 55 HP) whereas a valve seat of commercial use would experience wear of 0.030 inches after 100 hours in the same test. Vickers hardness number is about 400 $kg/mm^2$ at room temperature and about 280 $kg/mm^2$ at 500° C. These properties are favorably comparable to those of powder metal inserts or laser clad materials. The presence of the ceramic or metal oxide contributes to durability and sometimes solid lubrication.

Figure 6:
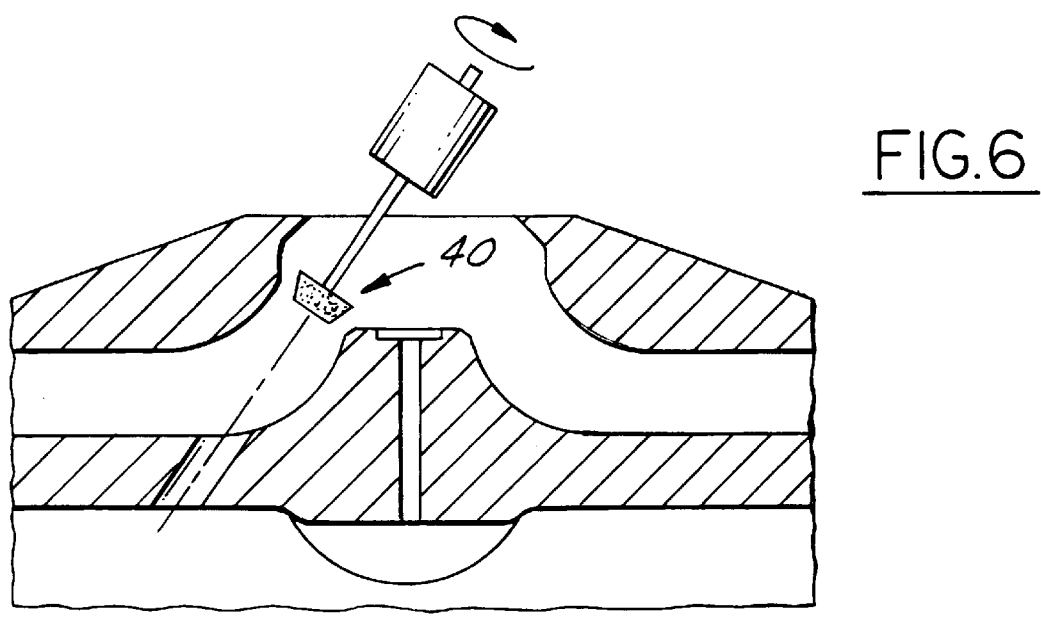
FIG. 6 is a cross sectional view of the head like in FIG. 3, illustrating how the final step of finishing each valve seat is carried out.

The thermally sprayed thin coating 31 conforms in layered shape to the supporting surface 27 or margin and has a surface roughness of about Ra 10–50 μm Ra. However, for purposes of precise finishing, a rotary machining tool 40 is used, such as shown in FIG. 6, to bring the valve seat to a precise surface finish of about 1–2 micrometers Ra. The machining tool may be a plunge milling head that defines several annular surfaces surrounding the valve seat as well as the seat itself.

Figure 7:
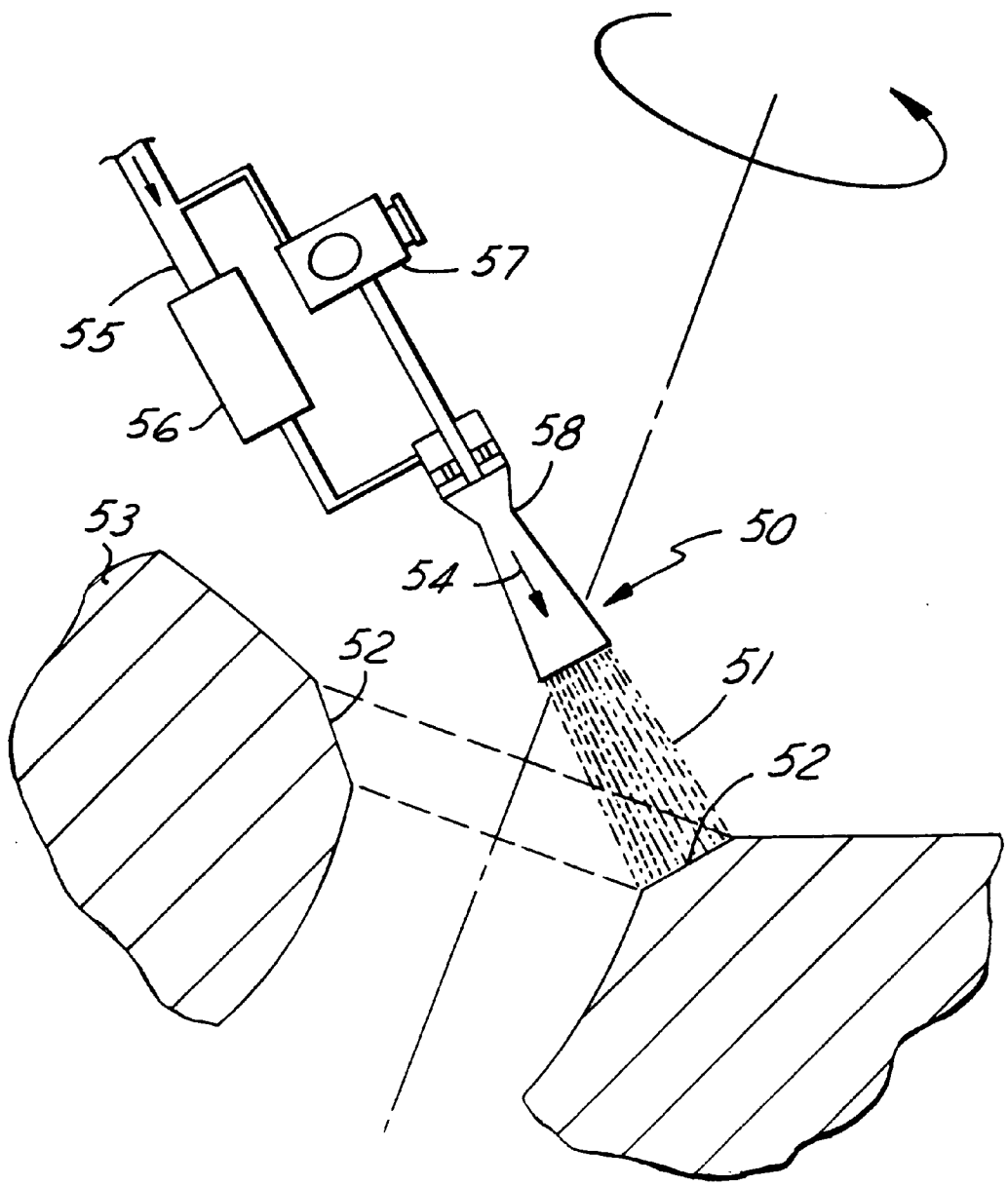
FIG. 7 is illustration of an alternative mode of thermal spraying using lower temperature gases to form a deposit from solid particles.

Spraying may also be carried out alternatively at lower temperature; use of a high-definition high-velocity gas-dynamic spray gun can be used to create a well defined seat region on aluminum heads under ambient temperatures. As shown in FIG. 7, a high velocity, gas dynamic spray nozzle 50 deposits powder material 51 at a highly defined and localized metalizing region 52 to constitute a valve seat. Since such spray nozzle 50 controls the coating through gas dynamic processes (supersonic flow) it is possible to form the seat region without the need for masking which is typically necessary with thermal spray processes and thus minimizes cleanup. Gas dynamic spraying is herein taught to produce a composite structure by introduction of a powder admixture 51 through the gun nozzle 52. A coating is formed by exposing the substrate 53 to a high-velocity stream of solid-phase particles 51 which have been accelerated by a supersonic jet of gas 54 at temperatures much lower than the melting or softening temperature of the particles. FIG. 7 shows schematically the arrangement for accomplishing the process. The propulsion gas (compressed air at an elevated pressure typically about 1.7 Mpa or 250 psi) is introduced to a manifold system 55 containing a gas heater 56 and powder metering vessel 57. Heating of the pressurized gas is accomplished electrically, in contrast to high velocity oxy-fuel high velocity air-fuel and detonation processes that achieve elevated pressures and particle velocities by combustion of fuel and oxidizer. The high-pressure, high-temperature (approximately 200° C.) gas is then introduced into a de Laval type nozzle 50 wherein compression through a throat region 58 followed by expansion to nominally atmospheric pressure results in both a supersonic flow condition and cooling of the gas stream. The powder feedstock is introduced on the high pressure side of the nozzle 50 by the precision metering device 57, which is also heated and maintained at the elevated pressure of the manifold. Through use of an enclosure and conventional dust collection devices it is possible to recover particles not incorporated into the coating for later recycling, and also to reduce the noise level to the 70–90 dB range. Typically, compressed, dry air or nitrogen may be used as the propulsion gas, although gases of lower molecular or atomic weight can lead to higher gas velocities with reduced or no preheating. Gas mixtures may also be used as a means of achieving higher velocities than those obtained by preheating compressed air or nitrogen. A fundamental feature of this process is the concept of a critical velocity for each coating and substrate material combination, below which the particles have, on the average, insufficient kinetic energy to be incorporated into a coating, and are either reflected from the surface or cause erosion of the substrate and any coating buildup which had begun.

Relatively cold gas spraying permits the use of phase separated alloy powders, originally made thermally by gas atomization, or admixtures of highly conductive matrix phases and hard wear-resistant particles. The microhardness of claddings formed by high velocity gas dynamic spraying is in excess of that formed by prior art techniques such as laser claddings and is favorably comparable to that produced by other thermal spraying techniques.

While particular embodiments of the invention have been illustrated and described, it will be obvious to those skilled in the art that various changes and modifications may be made without departing from the invention, and it is intended to cover in the appended claims all such modification and equivalents as fall within the true spirit and scope of this invention.

We claim:

1. A method of defining a valve seat on a metal valve seat support of an internal combustion engine, comprising;
   (a) forming and shaving an annular margin surface on said valve seat support and roughening said margin surface to a surface finish of 10–50 µm Ra, said forming, shaping and roughening being carried out simultaneously by electric discharge machining; and
   (b) thermally spraying a wear resistant coating onto said formed, shaped and roughened surface to provide a cladding thereon which has a mechanical bond to such surface without heat modification of the metallurgy of the valve seat support.

2. The method as in claim 1 in which said electric discharge machining is carried out at a power level of at least 4000 watts at an electrode gap of about 0.002 inches to achieve simultaneous pocket formation and said roughening.

3. The method as in claim 1 in which said pocket is machined to a depth of about 0.05–0.08 inches and a width of about 0.20 inches, and said roughening is characterized by asperities of 200–400 µm.

4. A method of fabricating valve seats on a metal valve seat support of an internal combustion engine, said support having an exposed surface comprising;
   (a) simultaneously shaping and roughening the exposed surface of the valve seat support to a finish of 10–50 micrometers Ra;
   (b) thermally spraying a stream of particles onto said roughened support surface using gaseous propellants with sufficient heat and force to produce a dense adherent coating of metal and metal oxide particles in a thickness no greater than 1.5 millimeters; and
   (c) finish machining said coating to define a valve seat surface.

5. The method as in claim 4, in which said shaping and roughening is carried out by electrical discharge machining.

6. The method as in claim 5, in which said electrical discharge machining is carried out utilizing a voltage of about 80–100 volts, a current of 50–100 amps, a spark on time of 150–300 micro-seconds with a pause between such sparking of 100–200 microseconds and a shaping electrode tool for the roughening being spaced from the support surface by a gap of about 0.002 inches.

7. The method as in claim 5, in which in step (a), concurrent shaping and roughening is carried out on the support surface to produce a desired annular margin surface having the desired width, depth, location, and random asperities to a depth of 0.002 inches.

8. The method as in claim 4, in which said spraying is carried onto a focused deposition area by use of gas dynamics at lower temperature and high pressures compared to wire-arc thermal spraying, wherein a mixed multiple-phased powder supply is fed into a gas jet, said multiple-phased powder being an admixture of conductive and wear resistant particles.

9. The method as in claim 8 in which said gas dynamics is carried out at a temperature of about 200° C. and a pressure of about 250 psi.

10. The method as in claim 4, in which said oxides constitute up to about 10% by volume of the coating.

11. The method as in claim 4, in which step (b) is carried out by two wire arc thermal spraying wherein one of the wires is comprised of, by weight, 0.5–1% carbon, 1.6–2.0%Cr, 1.65–1.95%Mn, remainder Fe and the other wire is comprised of, by weight, an 3–4% Niobium, 8–10% Mo, 20–23 Cr, 5% Fe and about 58% Ni.

* * * * *